(12) United States Patent
Iwata

(10) Patent No.: US 7,393,893 B2
(45) Date of Patent: Jul. 1, 2008

(54) CURABLE ORGANOPOLYSILOXANE COMPOSITION AND MOTHER MOLD FOR CAST MOLDING

(75) Inventor: Mitsuhiro Iwata, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 478 days.

(21) Appl. No.: 11/178,503

(22) Filed: Jul. 12, 2005

(65) Prior Publication Data

US 2006/0014896 A1   Jan. 19, 2006

(30) Foreign Application Priority Data

Jul. 13, 2004   (JP) ............................. 2004-206456

(51) Int. Cl.
*C08L 83/05* (2006.01)

(52) U.S. Cl. ............................ 524/588; 528/15; 528/31; 528/32

(58) Field of Classification Search ................. 524/588; 528/15, 31, 32
See application file for complete search history.

(56) References Cited

U.S. PATENT DOCUMENTS

| | | | |
|---|---|---|---|
| 3,159,601 A | 12/1964 | Ashby | |
| 3,159,662 A | 12/1964 | Ashby | |
| 3,220,972 A | 11/1965 | Lamoreaux | |
| 3,775,452 A | 11/1973 | Karstedt | |
| 5,288,795 A | 2/1994 | Fujiki et al. | |
| 5,777,047 A | 7/1998 | Chung et al. | |
| 2002/0129898 A1* | 9/2002 | Takuman et al. | ............ 156/329 |

FOREIGN PATENT DOCUMENTS

CN   1186818 A   7/1998

* cited by examiner

*Primary Examiner*—Kuo-Liang Peng
(74) *Attorney, Agent, or Firm*—Oblon, Spivak, McClelland, Maier & Neustadt, P.C.

(57) ABSTRACT

A curable organopolysiloxane composition is provided, which is capable of generating a silicone rubber mother mold with improved mold release durability. The composition includes (A) 100 parts by mass of an organopolysiloxane containing at least two Si-bonded alkenyl groups within each molecule, (B) an organohydrogenpolysiloxane containing at least two Si-bonded hydrogen atoms atoms within each molecule, in sufficient quantity to provide 0.4 to 5.0 mols of Si-bonded hydrogen atoms within the component (B) for each 1 mol of Si-bonded alkenyl groups within the composition, (C) 5 to 50 parts by mass of a finely powdered silica with a specific surface area measured by nitrogen gas absorption of at least 50 m$^2$/g, (D) 0.1 to 50 parts by mass of heavy calcium carbonate with a specific surface area measured by air permeability of 0.5 to 2.5 m$^2$/g, the surface of which has been treated with a paraffin-based compound, and (E) an effective quantity of a platinum group metal-based catalyst.

7 Claims, No Drawings

CURABLE ORGANOPOLYSILOXANE COMPOSITION AND MOTHER MOLD FOR CAST MOLDING

BACKGROUND OF THE INVENTION

1. Field of the Invention

The present invention relates to a curable organopolysiloxane composition and a mother mold for cast molding that is produced by molding and curing the curable organopolysiloxane composition.

2. Description of the Prior Art

Cast molding techniques, in which a urethane resin, epoxy rein, or gypsum or the like is cast and cured within a silicone rubber mother mold to generate a plurality of replicas, are widely known, and replicas formed in this manner from urethane resins and the like are currently used in vehicle components, components for household appliances, and decorative components in construction and the like.

In recent years, considerable emphasis has been placed on the properties these types of cast molded products exhibit when used as components within vehicles or household appliances. As a result, improvements have been introduced, including the use of urethane resins of superior strength, reliability, and texture as the casting resin. However, as a result of introducing such superior casting resins, the mechanical strength of the silicone rubber mother mold used for the cast molding, and the elongation properties required as a rubber elastic body tend to decrease, and the mold release durability also suffers, meaning producing a multitude of replicas with the same shape and quality (for example, surface state) from a single mother mold has become increasingly difficult.

Accordingly, in those cases where a multitude of replicas must be produced, a special curable resin with a low curing shrinkage ratio must first be cast in the silicone resin mother mold, thereby producing an inverse mother mold (master) that corresponds with the shape of the master model, and this inverse mother mold must then be used to prepare a plurality of silicone rubber matrices.

The development of a silicone rubber mother mold with improved mold release durability, which would enable the production of a multitude of replicas from a single mother mold, even if the replicas are produced using casting resins with the types of properties described above, has been keenly sought.

As a result, in order to improve the mold release durability, and particularly the tear strength of the silicone rubber mother mold, methods have been adopted in which reinforced silica fillers that have undergone hydrophobic treatment with a silazane-based compound such as those represented by the formulas $(CH_3)_3SiNHSi(CH_3)_3$, $(CH_3)_3SiNHSi(CH_3)_2NHSi(CH_3)_3$, or $(CF_3CH_2CH_2)(CH_3)_2SiNH(CF_3CH_2CH_2)(CH_3)_2$; reinforced silica fillers that have undergone hydrophobic treatment with a combination of an aforementioned silazane-based compound and a vinyl group-containing compound, such as those represented by the formulas $(CH_2=CH)(CH_3)_2SiNH(CH_3)_2(CH_2=CH)$, $(CH_3)_3SiNHSi(CH_3)(CH_2=CH)NHSi(CH_3)_3$, $(CH_3)_3SiNHSi(CH_3)(CH_2=CH)[OSi(CH_3)_2]NHSi(CH_3)_3$, or $(CH_2=CH)Si[NHSi(CH_3)_3]_3$; or reinforced silica fillers that have undergone hydrophobic treatment with an aforementioned silazane-based compound followed by a second further treatment with an aforementioned vinyl group-containing compound, are added to, and blended into the raw materials of the organopolysiloxane composition (see patent reference 1).

However, although these methods enable some improvement in the mold release durability, they are still insufficient to generate a silicone rubber mother mold that is capable of producing a multitude of replicas using a casting resin such as a urethane resin or epoxy resin with the type of superior levels of strength, reliability and texture and the like that are considered mainstream nowadays.

Furthermore, the applicants of the present invention have also proposed the use of an organopolysiloxane composition containing a blended alkaline material selected from a group consisting of alkali metal hydroxides, alkali metal oxides, alkali metal alcoholates, and alkali metal siliconates, as a method of improving the mold release durability of a silicone rubber mother mold (see patent reference 1). However, depending on the casting resin used, the silicone rubber mother mold produced from this composition may be prone to decreases in the strength and elongation properties, essential requirements as a rubber, meaning further improvements are still required.

[Patent Reference 1]
U.S. Pat. No. 5,288,795

SUMMARY OF THE INVENTION

Taking due consideration of the conventional technology described above, an object of the present invention is to provide a curable organopolysiloxane capable of generating a silicone rubber mother mold with superior mold release durability, and a mother mold for cast molding produced by molding and curing such a curable organopolysiloxane composition.

In order to achieve the above object, the present invention provides a curable organopolysiloxane composition comprising:

(A) 100 parts by mass of an organopolysiloxane containing at least two alkenyl groups bonded to silicon atoms within each molecule, (B) an organohydrogenpolysiloxane containing at least two hydrogen atoms bonded to silicon atoms within each molecule, in sufficient quantity to provide from 0.4 to 5.0 mols of hydrogen atoms bonded to silicon atoms within the component (B) for each 1 mol of alkenyl groups bonded to silicon atoms within the composition, (C) 5 to 50 parts by mass of a finely powdered silica with a specific surface area measured by nitrogen gas absorption of at least 50 $m^2/g$, (D) 0.1 to 50 parts by mass of heavy calcium carbonate with a specific surface area measured by air permeability of 0.5 to 2.5 $m^2/g$, the surface of which has been treated with a paraffin-based compound, and (E) an effective quantity of a platinum group metal-based catalyst.

In addition, the present invention also provides a cast molding mother mold produced by molding and curing the above curable organopolysiloxane composition.

A curable organopolysiloxane composition of the present invention generates a silicone rubber mother mold with improved mold release durability. Using this mother mold, a multitude of replicas can be produced by cast molding, even if these replicas are produced using a casting resin such as a urethane resin or epoxy resin with superior levels of strength, reliability and texture and the like.

DETAILED DESCRIPTION OF THE PREFERRED EMBODIMENTS

As follows is a more detailed description of the present invention.

[Component (A)]

The component (A) of a composition of the present invention is an organopolysiloxane containing at least two alkenyl groups bonded to silicon atoms within each molecule, and is the primary component (base polymer) of the composition of the present invention.

Examples of this organopolysiloxane include organopolysiloxanes represented by an average composition formula (1) shown below:

$$R^1_m R^2_n SiO_{(4-m-n)/2} \quad (1)$$

(wherein, each $R^1$ group represents, independently, an unsubstituted or substituted monovalent hydrocarbon group that contains no aliphatic unsaturated bonds, each $R^2$ group represents, independently, an alkenyl group, m is a number from 0.7 to 2.2, and preferably from 1.8 to 2.1, and even more preferably from 1.95 to 2.0, n is a number from 0.0001 to 0.2, and preferably from 0.0001 to 0.1, and even more preferably from 0.01 to 0.05, and the sum m+n is a number within a range from 0.8 to 2.3, and preferably from 1.9 to 2.2, and even more preferably from 1.98 to 2.05), which also contain at least two alkenyl groups bonded to silicon atoms within each molecule.

The above $R^1$ groups are preferably monovalent hydrocarbon groups of 1 to 10 carbon atoms, and suitable examples include alkyl groups such as methyl groups, ethyl groups, propyl groups, isopropyl groups, butyl groups, isobutyl groups, tert-butyl groups, hexyl groups, octyl groups, and decyl groups; aryl groups such as phenyl groups, tolyl groups, xylyl groups, and naphthyl groups; cycloalkyl groups such as cyclopentyl groups and cyclohexyl groups; aralkyl groups such as benzyl groups, 2-phenylethyl groups, and 3-phenylpropyl groups; and groups in which a portion of, or all of, the hydrogen atoms within these groups have been substituted with a halogen atom such as a chlorine atom, bromine atom, or fluorine atom, or a cyano group, including chloromethyl groups, 2-bromoethyl groups, 3,3,3-trifluoropropyl groups, and cyanoethyl groups.

Of these, methyl groups, phenyl groups, or a combination of these two groups are particularly preferred in terms of the ease of synthesis of the organopolysiloxane of the component (A) and the resulting chemical stability. Furthermore, in those cases where an organopolysiloxane with particularly superior solvent resistance is required, combinations with trifluoropropyl groups are particularly desirable.

The aforementioned $R^2$ groups are preferably alkenyl groups of 2 to 8 carbon atoms, and suitable examples include vinyl groups, allyl groups, 1-propenyl groups, isopropenyl groups, 1-butenyl groups, isobutenyl groups, and hexenyl groups. Of these, for the aforementioned reasons of ease of synthesis of the organopolysiloxane of the component (A) and chemical stability, vinyl groups are preferred.

The organopolysiloxane of the component (A) is preferably a straight chain structure in which the principal chain basically comprises repeating diorganosiloxane units, and both molecular chain terminals are blocked with triorganosiloxy groups (namely, a diorganopolysiloxane), although structures containing partial branching are also suitable. Furthermore, there are no particular restrictions on the bonding positions for the alkenyl groups, which may be bonded to silicon atoms at the molecular chain terminals, non-terminal silicon atoms (within the molecular chain), or to both types of silicon atoms.

The viscosity at 23° C. of this organopolysiloxane is typically within a range from 100 to 1,000,000 mPa·s, and preferably from 1,000 to 100,000 mPa·s. If this viscosity is too low, then the physical properties of the resulting cured product may be unsatisfactory for use as a cast molding mother mold. Furthermore, if the viscosity is too high, then the product composition becomes overly viscous, leading to a large deterioration in workability due to handling difficulties.

Specific examples of this component (A) include copolymers of dimethylsiloxane and methylvinylsiloxane with both molecular chain terminals blocked with trimethylsiloxy groups, methylvinylpolysiloxane with both molecular chain terminals blocked with trimethylsiloxy groups, copolymers of dimethylsiloxane, methylvinylsiloxane, and methylphenylsiloxane with both molecular chain terminals blocked with trimethylsiloxy groups, dimethylpolysiloxane with both molecular chain terminals blocked with dimethylvinylsiloxy groups, methylvinylpolysiloxane with both molecular chain terminals blocked with dimethylvinylsiloxy groups, copolymers of dimethylsiloxane and methylvinylsiloxane with both molecular chain terminals blocked with dimethylvinylsiloxy groups, copolymers of dimethylsiloxane, methylvinylsiloxane, and methylphenylsiloxane with both molecular chain terminals blocked with dimethylvinylsiloxy groups, and dimethylpolysiloxane with both molecular chain terminals blocked with trivinylsiloxy groups.

The organopolysiloxane of this component (A) may use either a single material, or a combination of two or more different materials.

[Component (B)]

The component (B) of a composition of the present invention is an organohydrogenpolysiloxane containing at least two, and preferably three or more, hydrogen atoms bonded to silicon atoms (SiH) within each molecule, which functions as a cross-linking agent for generating a silicone rubber cured product with a practical level of strength, via a mechanism in which the SiH groups within the component undergo a conventional hydrosilylation addition reaction with the alkenyl groups bonded to silicon atoms within the aforementioned component (A).

Examples of this type of organohydrogenpolysiloxane include the polymers represented by an average composition formula (2) shown below:

$$R_a H_b SiO_{(4-a-b)/2} \quad (2)$$

(wherein, each R represents, independently, an unsubstituted or substituted monovalent hydrocarbon group, a represents a number from 0.7 to 2.1, and preferably from 1.0 to 2.0, b represents a number from 0.001 to 1.0, and preferably from 0.01 to 1.0, and a+b represents a number within a range from 0.8 to 3.0, and preferably from 1.5 to 2.5), which also contain at least two, and preferably from 2 to 200, and even more preferably from 3 to 100, SiH groups within each molecule.

The R groups are preferably monovalent hydrocarbon groups of 1 to 10 carbon atoms, and suitable examples include the same groups presented as examples of the aforementioned group $R^1$. Groups containing no aliphatic unsaturated bonds are preferred.

There are no particular restrictions on the molecular structure of this organohydrogenpolysiloxane, and straight chain, cyclic, branched, or three dimensional network structures are all suitable. The number of silicon atoms within each molecule (the polymerization degree) is typically within a range from 2 to 300, and preferably from 4 to 200, and the viscosity at 23° C. is typically within a range from 1 to 500 mPa·s, and preferably from 5 to 300 mPa·s.

Furthermore, there are no particular restrictions on the bonding positions of the hydrogen atoms bonded to silicon atoms, and these may be bonded to silicon atoms at the molecular chain terminals, non-terminal silicon atoms (within the molecular chain), or both these types of silicon atoms.

Specific examples of the organohydrogenpolysiloxane of this component (B) include methylhydrogencyclopolysiloxanes such as 1,1,3,3-tetramethyldisiloxane, 1,3,5,7-tetramethylcyclotetrasiloxane, and 1,3,5,7,9-pentamethylcyclopentasiloxane, cyclic copolymers of methylhydrogensiloxane and dimethylsiloxane, methylhydrogenpolysiloxane with both terminals blocked with trimethylsiloxy groups, copolymers of dimethylsiloxane and methylhydrogensiloxane with both terminals blocked with trimethylsiloxy groups, dimethypolysiloxane with both terminals terminated with dimethylhydrogensiloxy groups, copolymers of dimethylsiloxane and methylhydrogensiloxane with both terminals terminated with dimethylhydrogensiloxy groups, copolymers of methylhydrogensiloxane, diphenylsiloxane, and dimethylsiloxane with both terminals blocked with trimethylsiloxy groups, copolymers of methylhydrogensiloxane, dimethylsiloxane, and diphenylsiloxane with both terminals terminated with dimethylhydrogensiloxy groups, copolymers comprising siloxane units represented by the formula $(CH_3)_2HSiO_{1/2}$, siloxane units represented by the formula $(CH_3)_3SiO_{1/2}$, and siloxane units represented by the formula $SiO_{4/2}$, copolymers comprising siloxane units represented by the formula $(CH_3)_2HSiO_{1/2}$ and siloxane units represented by the formula $SiO_{4/2}$, and copolymers comprising siloxane units represented by the formula $(CH_3)_2HSiO_{1/2}$, siloxane units represented by the formula $SiO_{4/2}$, and siloxane units represented by the formula $(C_6H_5)_3SiO_{1/2}$.

The organohydrogenpolysiloxane of this component (B) may use either a single material, or a combination of two or more different materials.

The blend quantity of the component (B) within a composition of the present invention must be sufficient to provide from 0.4 to 5.0 mols, and preferably from 0.8 to 3.0 mols, and even more preferably from 1.0 to 2.5 mols, of SiH groups within the component (B) for each 1 mol of alkenyl groups bonded to silicon atoms within the composition, and in particular, for each 1 mol of alkenyl groups bonded to silicon atoms within the component (A).

[Component (C)]

Generally, cast molding matrices require superior physical properties, particularly strength, in order to withstand the rigors of use. Furthermore, when a cast molding mother mold is formed from a curable organopolysiloxane composition, the mother mold may be formed as a reverse taper-shape, depending on the shape of the master model, and if the strength, and particularly the tear strength, of the cured product (silicone rubber) is not high enough, then when the master model is removed, the mother mold may become damaged, preventing its subsequent use as a mother mold. Furthermore, when a reverse taper-shaped mother mold is used for producing replicas, each replica must be removed from the mother mold, meaning the silicone rubber mother mold requires not only favorable elasticity, but also favorable strength.

The finely powdered silica of the component (C) of a composition of the present invention imparts strength to the cured product (silicone rubber), and is blended into the composition so that during formation and subsequent use of the cast molding mother mold, the problems described above do not arise. The specific surface area (measured by nitrogen gas absorption (BET method)) of the silica must be at least 50 $m^2/g$ (and typically from 50 to 400 $m^2/g$), and is preferably within a range from 100 to 350 $m^2/g$.

This finely powdered silica may be either hydrophilic or hydrophobic. Examples of suitable hydrophilic silicas include products such as Aerosil 50, 130, 200, and 300 (brand names, manufactured by Nippon Aerosil Co., Ltd.), Cabosil MS-5 and MS-7 (brand names, manufactured by Cabot Corporation), Rheorosil QS-102 and 103 (brand names, manufactured by Tokuyama Corporation), and Nipsil LP (a brand name, manufactured by Nippon Silica Industry Co., Ltd.), whereas examples of suitable hydrophobic silicas include products such as Aerosil R-812, R-812S, R-972, and R-974 (brand names, manufactured by Degussa AG), Rheorosil MT-10 (a brand name, manufactured by Tokuyama Corporation), and the Nipsil SS series (a brand name, manufactured by Nippon Silica Industry Co., Ltd.).

The powdered silica of this component (C) may use either a single material, or a combination of two or more different materials.

In those cases where an aforementioned finely powdered hydrophilic silica is used, the surface of the silica is preferably subjected to a hydrophobic surface treatment, if required. Examples of suitable hydrophobic treatment agents include organosilazanes such as hexamethyldisilazane, halogenated silanes such as methyltrichlorosilane, dimethyldichlorosilane, and trimethylchlorosilane, and organoalkoxysilanes in which the above halogen atoms have been substituted with alkoxy groups such as methoxy groups or ethoxy groups. One example of a hydrophobic treatment involves a method in which the finely powdered silica and the hydrophobic treatment agent are heated together for 2 to 4 hours at a temperature of 150 to 200° C., and preferably from 150 to 180° C. Products that have undergone prior surface treatment may be used in a composition of the present invention, although surface treatment may also be conducted during preparation of the composition of the present invention, by adding a hydrophobic treatment agent at the same time as the component (C).

The blend quantity of the component (C) within a composition of the present invention must fall within a range from 5 to 50 parts by mass per 100 parts by mass of the component (A) described above. If the blend quantity is less than 5 parts by mass, then the strengthening effect is inadequate, whereas if the quantity exceeds 50 parts by mass, then the flowability of the composition of the present invention deteriorates markedly, and the releasability of the product mother mold also deteriorates.

[Component (D)]

The component (D) of a composition of the present invention is a heavy calcium carbonate with a specific surface area (measured by air permeability) of 0.5 to 2.5 $m^2/g$, the surface of which has been treated with a paraffin-based compound. When the composition of the present invention is molded and cured to form a cast molding mother mold, and this mother mold is then used for producing replicas by cast molding a casting resin such as a urethane resin with superior levels of strength, reliability and texture, the component (D) is able to improve the mold release durability of the mother mold, thereby enabling a multitude of replicas with the same shape and quality to be produced from a single mother mold.

The use of a heavy calcium carbonate that has undergone surface treatment with a paraffin-based compound as the component (D) is preferred, as unlike those cases where either untreated heavy calcium carbonate, or heavy calcium carbonate that has undergone surface treatment with a different non-paraffin-based compound such as a fatty acid or resin acid is used, the aforementioned improvement in mold release durability can be achieved, and moreover, the component does not act as a catalyst poison for the platinum-based catalyst, meaning it does not impair the curing of the composition of the present invention.

Examples of the paraffin-based compound used in the surface treatment described above include paraffin waxes and polyethylene waxes represented by the molecular formula $CH_3-(CH_2)_n-CH_3$ (wherein n represents an integer from 16 to 40, and preferably from 20 to 30). The quantity used of the paraffin-based compound is typically within a range from 0.1 to 10 parts by mass, and preferably from 0.5 to 5 parts by mass, per 100 parts by mass of the raw material heavy calcium carbonate.

Furthermore, because the composition of the present invention is used to prepare a silicone rubber mother mold by cast molding, flowability requirements for the composition mean that the specific surface area (measured by air permeability) of the component (D) must fall within a range from 0.5 to 2.5 m²/g.

Heavy calcium carbonate that has undergone prior surface treatment may be used as the component (D), although surface treatment may also be conducted during preparation of the composition of the present invention, by adding heavy calcium carbonate and the paraffin-based compound at the same time as the aforementioned components (A) and (B), prior to the addition of the platinum group metal-based catalyst of the component (E) described below, and then mixing the components under heating at 150 to 200° C. In those cases where surface treatment is conducted during the preparation of the composition, the surface treatment must be completed before blending in the platinum group metal-based catalyst of the component (E).

The blend quantity of the component (D) within a composition of the present invention must fall within a range from 0.1 to 50 parts by mass, and preferably from 1 to 30 parts by mass, per 100 parts by mass of the component (A) described above. If the blend quantity is less than 0.1 parts by mass, then the improvement effect on the mold release durability of the cast molding mother mold produced from the composition is inadequate, whereas if the quantity exceeds 50 parts by mass, the viscosity of the composition increases, which causes a marked deterioration in the flowability during molding of the mother mold, leading to inferior workability.

[Component (E)]

The component (E) of a composition of the present invention is a platinum group metal-based catalyst, and can use any of the materials conventionally used as hydrosilylation reaction catalysts. Examples of suitable materials include platinum group simple metals such as platinum black, rhodium and palladium; platinum chlorides such as $H_2PtCl_4 \cdot nH_2O$, $H_2PtCl_6 \cdot nH_2O$, $NaHPtCl_6 \cdot nH_2O$, $KHPtCl_6 \cdot nH_2O$, $Na_2PtCl_6 \cdot nH_2O$, $K_2PtCl_4 \cdot nH_2O$, $PtCl_4 \cdot nH_2O$, $PtCl_2$ and $Na_2HPtCl_4 \cdot nH_2O$ (wherein, n represents an integer from 0 to 6, and preferably either 0 or 6); chloroplatinic acid and chloroplatinates; alcohol modified chloroplatinic acid (see U.S. Pat. No. 3,220,972); complexes of chloroplatinic acid and olefins (see U.S. Pat. No. 3,159,601, No. 3,159,662 and No. 3,775,452); a platinum group metal such as platinum black or palladium supported on a carrier such as alumina, silica or carbon; rhodium-olefin complexes; chlorotris(triphenylphosphine)rhodium (Wilkinson's catalyst); and complexes of platinum chloride, chloroplatinic acid or a chloroplatinate with a vinyl group containing siloxane and particularly a vinyl group containing cyclic siloxane. Of these, platinum catalysts such as chloroplatinic acid, platinum-olefin complexes, platinum-vinylsiloxane complexes, platinum black, and platinum-triphenylphosphine complexes are preferred.

There are no particular restrictions on the blend quantity of the component (E) within a composition of the present invention, which need only be sufficient to ensure the desired curing rate, although a typical quantity, calculated as a mass referenced quantity of platinum group metal, is within a range from 0.1 to 1,000 ppm, and preferably from 0.1 to 500 ppm, and even more preferably from 0.5 to 200 ppm, relative to the total mass of the composition of the present invention.

[Other Blend Components]

In addition to the components (A) through (E) described above, where required, other components may also be added to the composition of the present invention.

In addition, the composition of the present invention may also include (F) an organopolysiloxane resin with a three dimensional network structure as an optional component. If this component (F) is a resin that contains alkenyl groups bonded to silicon atoms within its molecular structure, then the strength of the cured product (silicone rubber) produced from the composition of the present invention can be further increased, which is desirable.

Suitable examples of this component (F) include resins comprising monofunctional siloxane units represented by the formula $R_3SiO_{1/2}$ (wherein, R represents an unsubstituted or substituted monovalent hydrocarbon group that contains no aliphatic unsaturated bonds) such as $(CH_3)_3SiO_{1/2}$, and siloxane units represented by the formula $SiO_{4/2}$.

Furthermore, particularly preferred materials for the component (F) are organopolysiloxane resins comprising, within each molecule, siloxane units containing an alkenyl group bonded to a silicon atom, together with either siloxane units represented by the formula $SiO_{4/2}$ and siloxane units represented by the formula $RSiO_{3/2}$ (wherein, R represents an unsubstituted or substituted monovalent hydrocarbon group that contains no aliphatic unsaturated bonds), or both of the above types of siloxane units, and where required, the aforementioned $R_3SiO_{1/2}$ units.

Examples of the above siloxane units containing an alkenyl group bonded to a silicon atom include siloxane units represented by the formula $R'SiO_{3/2}$, siloxane units represented by the formula $R'R''SiO_{2/2}$, and siloxane units represented by the formula $R'R''_2SiO_{1/2}$ (where in each formula, R' represents an alkenyl group, and R'' represents an unsubstituted or substituted monovalent hydrocarbon group that contains no aliphatic unsaturated bonds).

The group R is preferably a monovalent hydrocarbon group of 1 to 10 carbon atoms, and suitable examples include the same groups presented as examples of the group $R^1$ in relation to the average composition formula (1), although a methyl group or phenyl group is particularly desirable. The group R' is preferably an alkenyl group of 2 to 8 carbon atoms, and suitable examples include the same groups presented as examples of the group $R^2$ in relation to the average composition formula (1), although of these, a vinyl group is preferred. The group R'' is preferably a monovalent hydrocarbon group of 1 to 10 carbon atoms, and suitable examples include the same groups presented as examples of the group $R^1$ in relation to the average composition formula (1), although a methyl group or phenyl group is particularly desirable.

Specific examples of the aforementioned organopolysiloxane resin that comprises siloxane units containing an alkenyl group bonded to a silicon atom include resins comprising siloxane units represented by the formula $(CH_3)_3SiO_{1/2}$, siloxane units represented by the formula $(CH_2=CH)SiO_{3/2}$, and siloxane units represented by the formula $SiO_{4/2}$, resins comprising siloxane units represented by the formula $(CH_2=CH)(CH_3)_2SiO_{1/2}$ and siloxane units represented by the formula $SiO_{4/2}$, resins comprising $(CH_3)_3SiO_{1/2}$ units, $(CH_2=CH)(CH_3)_2SiO_{1/2}$ units, and $SiO_{4/2}$ units, resins comprising siloxane units represented by the formula $(CH_2=CH)(CH_3)_2SiO_{1/2}$, siloxane units represented by the formula $(CH_2=CH)SiO_{3/2}$, and siloxane units represented by the formula $SiO_{4/2}$, resins comprising $(CH_2=CH)(CH_3)_2SiO_{1/2}$ units, $(CH_3)SiO_{3/2}$ units, and $SiO_{4/2}$ units, and resins comprising $(CH_2=CH)(CH_3)_2SiO_{1/2}$ units, $(C_6H_5)SiO_{3/2}$ units, and $SiO_{4/2}$ units. The quantity of alkenyl groups such as vinyl groups within these resins is typically from 1 to 5 mol %, and preferably from 2 to 3 mol %, of all the silicon atom-bonded organic groups. If this alkenyl group content is less than 1 mol %, then achieving an increase in the strength of the silicone rubber cured product may be difficult, whereas if the quantity exceeds 5 mol %, then the elongation of the silicone rubber formed as the cured product of the composition of the present invention decreases, and the heat resistance may also deteriorate.

The blend quantity of the component (F) within a composition of the present is typically no more than 100 parts by mass (0 to 100 parts by mass), and preferably from 1 to 100 parts by mass, and even more preferably from 2 to 50 parts by mass, per 100 parts by mass of the component (A) described above.

In order to further improve the mold release durability of the silicone rubber mother mold obtained by curing a composition of the present invention, where necessary, an alkaline material as disclosed in U.S. Pat. No. 5,288,795 may also be added in addition to the above component (D). Examples of this alkaline material include alkali metal hydroxides such as LiOH, NaOH, KOH, and CsOH; alkali metal oxides such as $Li_2O$, $Na_2O$, and $K_2O$; alkali metal alcoholates such as $CH_3OK$, $C_2H_5OLi$, $C_2H_{50}ONa$, $C_2H_5OK$, $C_3H_7ONa$, and $C_3H_7OK$; and alkali metal siliconates such as those represented by the structural formulas shown below:

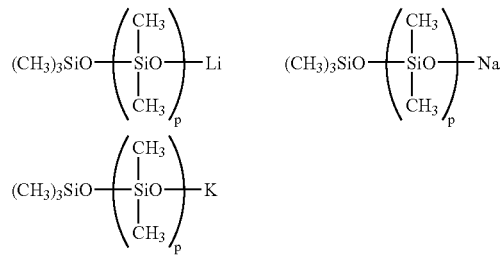

(where in each formula, p represents a positive integer).

In those cases where this type of alkaline material is added, the blend quantity is typically within a range from 0 to 5,000 ppm, and preferably from 5 to 5,000 ppm, on a mass basis, relative to the component (A) described above.

In order to adjust the curing time and the usable life of a composition of the present invention, either one, or a combination of two or more conventional curing retarders, including vinyl group-containing organopolysiloxanes such as 1-vinyl-1,3,3,5,5,7,7-heptamethylcyclotetrasiloxane; triallyl isocyanurate; alkyl maleates; acetylene alcohols, and silane or siloxane modified products thereof; hydroperoxides; tetramethylethylenediamine; and benzotriazole may be added to the composition of the present invention. If such curing retarders are added, then the blend quantity is typically within a range from 0 to 10 parts by mass, and preferably from 0.1 to 5 parts by mass, per 100 parts by mass of the component (A) described above.

Including components such as the aforementioned component (F), the quantity of SiH groups contained within the component (B), for each 1 mol of alkenyl groups bonded to silicon atoms within the composition, must fall within a range from 0.4 to 5.0 mols, and preferably from 0.8 to 3.0 mols, and even more preferably from 1.0 to 2.5 mols, as described above.

Furthermore, provided they do not impair the objects of the present invention, appropriate quantities of other additives, including colorants such as inorganic pigments like cobalt blue, and organic dyes; and heat resistance or flame retardancy improvement agents such as potassium oxide, zinc carbonate, manganese carbonate, red iron oxide, titanium oxide, and carbon black may also be added.

[Composition Preparation]

A composition of the present invention can be prepared by mixing predetermined quantities of each of the aforementioned components (A) through (E), and where necessary the component (F) and any other components, uniformly together.

For example, a composition of the present invention can be prepared by mixing the component (A) (organopolysiloxane) and the component (C) (finely powdered silica) under heating at a temperature of 100 to 200° C., and then adding and mixing the component (D) (surface treated heavy calcium carbonate), or by mixing the components (A), (C) and (D) at the same time under heating at a temperature of 100 to 200° C., and in either case, subsequently adding the compounds of the component (B) (organohydrogenpolysiloxane) and the component (E) (platinum group metal-based catalyst), and stirring the mixture thoroughly. There are no particular restrictions on the addition and mixing of the component (F) and any other components, which should be conducted as appropriate.

[Cast Molding Mother Mold]

As is commonly known to those skilled in the art, a silicone rubber mother mold can be prepared by injecting a composition of the present invention into a frame or container in which a master model has been positioned, thereby filling the container, subsequently curing the composition, and then removing the master model, thus yielding a silicone rubber mother mold that matches the shape of the master model. There are no particular restrictions on the curing conditions, and normal conditions can be employed, typically from 10 to 120 minutes at 40 to 80° C.

Using this silicone rubber mother mold as a cast molding mother mold, by injecting either a casting resin such as a urethane resin or epoxy resin with superior levels of strength, reliability and texture and the like, or gypsum or the like into the mother mold and then conducting curing, replicas with an identical shape to the master model can be produced.

In order to further improve the mold release durability of the silicone rubber mother mold, in other words, in order to enable an even greater multitude of replicas of the same shape and quality to be produced from a single mother mold, a mold release agent such as a silicone-based oil, a fluorine-based oil, or a material based thereon which is capable of forming a membrane, can also be applied to the mother mold.

EXAMPLES

As follows is a more detailed description of the present invention using a series of examples and comparative examples, although the present invention is in no way restricted to the examples presented below. In the following description, "parts" refers to parts by mass. Furthermore, the viscosity (Pa·s) values shown in the tables represent values measured at 23° C.

Example 1

(A) 800 parts of a dimethylpolysiloxane with both molecular chain terminals terminated with vinyldimethylsiloxy groups (viscosity at 23° C.: approximately 5,000 mPa·s), and (C1) 200 parts of a hydrophilic finely powdered silica: Aerosil 200 (brand name, manufactured by Nippon Aerosil Co., Ltd., specific surface area (measured by nitrogen gas absorption (BET method): 200 m²/g) were placed in a kneader, and while thorough mixing was being conducted, 80 parts of hexamethyldisilazane and 10 parts of water were added, and the resulting mixture was kneaded for one hour without heating. Subsequently, the temperature was raised to 150° C., mixing was continued for a further two hours, and the heating was then halted, and the mixture was allowed to stand and cool to room temperature. To 500 parts of the thus obtained mixture was added (E) a sufficient quantity of a chloroplatinic acid-octyl alcohol complex to provide 30 ppm of platinum metal relative to the total mass of the resulting composition, and following thorough mixing, 0.1 parts of 1-vinyl-1,3,3,5,5,7,7-heptamethylcyclotetrasiloxane as a curing retarder, (B) 2.5 parts of a methylhydrogenpolysiloxane represented by a structural formula (3) shown below (viscosity at 23° C.: 9 mPa·s):

$$HSi(CH_3)_2[OSi(CH_3)_2]_6[OSiH(CH_3)]_4Si(CH_3)_2H \qquad (3)$$

and (D) 7 parts of heavy calcium carbonate that had been surface treated with a paraffin-based compound represented by the average molecular formula $CH_3-(CH_2)_{26}-CH_3$ (MC Coat P-20 (brand name of Maruo Calcium Co., Ltd.), specific surface area (measured by air permeability): approximately 2 m²/g) were added and mixed thoroughly, and the resulting mixture was then defoamed under vacuum, thus yielding a curable organopolysiloxane composition (in which the molar ratio: SiH within the component (B)/[vinyl groups within the component (A) and 1-vinyl-1,3,3,5,5,7,7-heptamethylcyclotetrasiloxane] was 1.5). This composition is termed "Composition I". The viscosity was measured, and is shown in Table 1.

Example 2

With the exception of altering the blend quantity of the component (D) stated in the example 1 from 7 parts to 35 parts, a composition was prepared in the same manner as the example 1. This composition is termed "Composition II". The viscosity was measured, and is shown in Table 1.

Example 3

With the exceptions of replacing the component (C1) from the example 1 with (C2) 200 parts of a hydrophobic finely powdered silica: Aerosil R-812 (brand name, manufactured by Degussa AG, specific surface area (measured by nitrogen gas absorption (BET method): 200 m²/g), and altering the blend quantity of the component (D) from 7 parts to 35 parts, a composition was prepared in the same manner as the example 1. This composition is termed "Composition III". The viscosity was measured, and is shown in Table 1.

Example 4

With the exceptions of replacing the component (C1) from the example 1 with 200 parts of the component (C2) described in the example 3, not adding the 80 parts of hexamethyldisilazane and 10 parts of water, and altering the blend quantity of the component (D) from 7 parts to 35 parts, a composition was prepared in the same manner as the example 1. This composition is termed "Composition IV". The viscosity was measured, and is shown in Table 1.

Example 5

With the exceptions of replacing the component (C1) from the example 1 with (C3) 200 parts of a hydrophobic finely powdered silica: Aerosil R-974 (brand name, manufactured by Degussa AG, specific surface area (measured by nitrogen gas absorption (BET method): 200 m²/g), not adding the 80 parts of hexamethyldisilazane and 10 parts of water, and altering the blend quantity of the component (D) from 7 parts to 35 parts, a composition was prepared in the same manner as the example 1. This composition is termed "Composition V". The viscosity was measured, and is shown in Table 1.

Comparative Example 1

With the exception of not adding the component (D), a composition was prepared in the same manner as the example 1. This composition is termed "Composition VI". The viscosity was measured, and is shown in Table 1.

Comparative Example 2

With the exceptions of replacing the component (C1) from the example 1 with 200 parts of the component (C2) described in the example 3, and not adding the component (D), a composition was prepared in the same manner as the example 1. This composition is termed "Composition VII". The viscosity was measured, and is shown in Table 1.

Comparative Example 3

With the exceptions of replacing the component (C1) from the example 1 with 200 parts of the component (C2) described in the example 3, and not adding the component (D), the 80 parts of hexamethyldisilazane, or the 10 parts of water, a composition was prepared in the same manner as the example 1. This composition is termed "Composition VIII". The viscosity was measured, and is shown in Table 1.

Comparative Example 4

With the exceptions of replacing the component (C1) from the example 1 with 200 parts of the component (C3) described in the example 5, and not adding the component (D), the 80 parts of hexamethyldisilazane, or the 10 parts of water, a composition was prepared in the same manner as the example 1. This composition is termed "Composition IX". The viscosity was measured, and is shown in Table 1.

<Performance Evaluations>

The performance of the compositions obtained in each of the above examples and comparative examples was evaluated in the manner described below.

1. Each composition was cured at 60° C. for 2 hours to prepare a sheet of thickness 2 mm, and the general physical properties of the cured product were measured in accordance with JIS K6249. The results of the measurements are shown in Table 1.

2. Each composition was used to fill a container in which a master model had been positioned, and following curing for 2 hours at 60° C., the master model was removed, yielding a concave-shaped mother mold. An improved urethane resin: 3017 (brand name, manufactured by H&K Co., Ltd.) with superior levels of strength, reliability and texture to conventional products was then injected into the concave portion of the mother mold, the urethane resin was cured for 10 minutes at 70° C., and was then removed from the mother mold, yielding a urethane resin cast molded product. This cast molding process, involving injection of the urethane resin, curing, and removal of the cast molded product, was then repeated.

The surface gloss (%) of the molded product obtained from the first cast molding process was measured in accordance with JIS Z8741 (incident angle 60°, light receiving angle 60°). In a similar manner, the surface gloss (%) was also measured for the cured products obtained from the 5th, 10th, 15th, and 20th repetitions of the cast molding process. The results of the measurements, together with the number of cast molding repetitions, are shown in Table 2.

Regarding the figures shown in Table 2, a decrease in the gloss value with increasing repetitions of the cast molding process indicates that penetration of the casting resin has caused a deterioration in the surface of the concave portion of the mother mold, meaning a multitude of replicas with the same shape and quality are unable to be produced from a single mother mold, or in other words, that the mold release durability of the mother mold is inferior.

TABLE 1

| | Example No. | | | | | | | | |
| --- | --- | --- | --- | --- | --- | --- | --- | --- | --- |
| | Example | | | | | Comparative example | | | |
| | 1 | 2 | 3 | 4 | 5 | 1 | 2 | 3 | 4 |
| | Composition No. | | | | | | | | |
| | I | II | III | IV | V | VI | VII | VIII | IX |
| Viscosity (Pa · s) | 55 | 75 | 90 | 95 | 85 | 50 | 60 | 65 | 55 |
| Hardness (type A) | 43 | 48 | 44 | 46 | 45 | 38 | 34 | 36 | 35 |
| Elongation (%) | 300 | 270 | 250 | 220 | 230 | 380 | 370 | 310 | 330 |
| Tensile strength (MPa) | 5.1 | 6.2 | 5.9 | 5.3 | 5.5 | 5.0 | 4.7 | 4.8 | 4.6 |
| Tear strength (kN/m) | 20 | 29 | 27 | 25 | 25 | 18 | 14 | 17 | 16 |

TABLE 2

| | Example No. | | | | | | | | |
| --- | --- | --- | --- | --- | --- | --- | --- | --- | --- |
| | Example | | | | | Comparative example | | | |
| | 1 | 2 | 3 | 4 | 5 | 1 | 2 | 3 | 4 |
| | Composition No. | | | | | | | | |
| | I | II | III | IV | V | VI | VII | VIII | IX |
| Gloss (%) first repetition | 99 | 98 | 95 | 90 | 90 | 95 | 90 | 89 | 88 |
| Gloss (%) 5th repetition | 85 | 90 | 89 | 93 | 91 | 90 | 85 | 90 | 90 |
| Gloss (%) 10th repetition | 88 | 91 | 94 | 90 | 85 | 55 | 63 | 52 | 50 |
| Gloss (%) 15th repetition | 65 | 92 | 91 | 89 | 81 | 30 | 39 | 32 | 34 |
| Gloss (%) 20th repetition | 55 | 86 | 87 | 83 | 79 | 21 | 22 | 12 | 11 |

What is claimed is:

1. A curable organopolysiloxane composition comprising:
   (A) 100 parts by mass of an organopolysiloxane containing at least two alkenyl groups bonded to silicon atoms within each molecule,
   (B) an organohydrogenpolysiloxane containing at least two hydrogen atoms bonded to silicon atoms within each molecule, in sufficient quantity to provide from 0.4 to 5.0 mols of hydrogen atoms bonded to silicon atoms for each 1 mol of alkenyl groups bonded to silicon atoms within said composition,
   (C) 5 to 50 parts by mass of a finely powdered silica with a specific surface area measured by nitrogen gas absorption of at least 50 m$^2$/g,
   (D) 0.1 to 50 parts by mass of heavy calcium carbonate with a specific surface area measured by air permeability of 0.5 to 2.5 m$^2$/g, the surface of which has been treated with a paraffin-based compound, and
   (E) an effective quantity of a platinum group metal-based catalyst.

2. The curable organopolysiloxane composition as claimed in claim 1, further comprising (F) from 0 to 100 parts by mass of an organopolysiloxane resin with a three dimensional network structure.

3. The curable organopolysiloxane composition as claimed in claim 2, wherein said component (F) is an organopolysiloxane resin containing, within each molecule, siloxane units containing an alkenyl group bonded to a silicon atom, together with either siloxane units represented by a formula $SiO_{4/2}$ and siloxane units represented by a formula $RSiO_{3/2}$ (wherein, R represents an unsubstituted or substituted monovalent hydrocarbon group that contains no aliphatic unsaturated bonds), or both of said siloxane units and additional $R_3SiO_{1/2}$ units (wherein R is as defined above).

4. A mother mold for cast molding, produced by molding and curing the curable organopolysiloxane composition as claimed in any one of claims 1 through 3.

5. A process, comprising curing the curable organopolysiloxane compositions as claimed in any one of claims 1 through 3.

6. A process, comprising injecting a casting resin into the mother mold of claim 4 and curing the casting resin.

7. A process, comprising injecting gypsum into the mother mold of claim 4 and curing the gypsum.

* * * * *